United States Patent [19]
Knapp et al.

[11] 3,811,540
[45] May 21, 1974

[54] SELF-ADJUSTING DEVICE FOR DISC BRAKES

[75] Inventors: Wilhelm Knapp, Banngarten; Siegfried Ohmayer, Odenwaldring, both of Germany

[73] Assignee: ITT Industries, Inc., New York, N.Y.

[22] Filed: Sept. 22, 1972

[21] Appl. No.: 290,283

[30] Foreign Application Priority Data
Oct. 11, 1971 Germany............................ 2150636

[52] U.S. Cl. ............................ 188/196 D, 188/71.9
[51] Int. Cl. ............................................ F16d 65/56
[58] Field of Search ........... 188/196 F, 196 D, 71.8, 188/71.9

[56] References Cited
UNITED STATES PATENTS
3,498,423 3/1970 Belart............................ 188/196 F
3,592,299 7/1971 Erdmann................... 188/196 F X

*Primary Examiner*—Duane A. Reger
*Attorney, Agent, or Firm*—John T. O'Halloran; Menotti J. Lombardi, Jr.; Alfred C. Hill

[57] ABSTRACT

There is disclosed a self-adjusting device for the brake lining clearance of a hydraulically actuated spot-type disc brake having a cup-shaped actuating piston. The piston is contained in the hydraulically actuated brake cylinder. A spring housing is inserted into the piston and is resiliently clamped in position therein by the interior surface of the piston. A threaded adjusting spindle and an adjusting nut threaded onto the spindle in a self-locking manner are disposed coaxially within the housing. An engaging element having an inclined ramp is disposed coaxially about the nut and which upon adjustment is in a torsionally locked connection with the nut. A spring is disposed within the housing coaxial of the exterior surface of the nut and is in a cooperative relationship with the engaging element. A post is fixed to the inner surface of the housing and cooperates with the ramp to enable the desired adjustment. The desired clearance between the disc of the disc brake and the brake lining is provided by the cooperating threads of the spindle and the nut.

15 Claims, 4 Drawing Figures

3,811,540

SELF-ADJUSTING DEVICE FOR DISC BRAKES

BACKGROUND OF THE INVENTION

The invention relates to a self-adjusting device for disc brake cup-shaped pistons with an adjusting spindle firmly connected with the cylinder, and adjusting nut screwed onto said spindle in a self-locking manner, an engaging element with an inclined ramp, said engaging element being in a torsionally locked connection with the adjusting nut upon adjustment only, and a post firmly connected with the piston, said post cooperating with the ramp to enable the desired adjustment. The prescribed brake lining clearance is provided within the adjusting thread of the adjusting spindle and the adjusting nut.

SUMMARY OF THE INVENTION

The object of the present invention is to design an adjusting device which can be manufactured cheaply, assembled easily and quickly and attended to without any difficulty. As few as possible easily manufacturable parts should be used for the device. At the same time the device should be extremely safe with regards to operation upon frequent use.

A feature of the present invention is the provision of a self-adjusting device for brake lining clearance of disc brakes comprising: a cup-shaped piston contained in a hydraulically actuated brake cylinder; a spring housing having a longitudinal axis; a threaded adjusting spindle disposed coaxially within the housing; an adjusting nut disposed within the housing and threaded onto the spindle in a self-locking manner; an engaging element having an inclined ramp which, upon adjustment only, is in a torsionally locked connection with the nut; a spring disposed within the housing, coaxial with the exterior surface of the nut and in cooperative relation to the engaging element; and a post fixed to the housing to cooperate with the ramp to enable the desired adjustment; the clearance being provide by the cooperating threads of the spindle and the nut; and the housing is inserted into the piston and is resiliently clamped in position therein by the interior surface of the piston.

Due to the above-mentioned design a special processing of the interior of the cup-shaped piston is not necessary since the spring housing with all parts fixed therein has only to be pressed into the aperture or hollow of the cup-shaped piston which will remain there as a fixed component of the piston as a consequence of the resilient clamping effect.

In a preferred embodiment the cup-shaped piston simply has a cylindrical recess or aperture into which the spring housing, which is mainly cylindrical, is pressed.

A further embodiment provides that the recess of the cup-shaped piston has a cylindrical shape adapted to the clamping reception of the spring housing in the area of the bottom only and that the recess expands towards the rear in a conical or stepwise manner. In this embodiment a good clamping effect of the spring housing is safeguarded, on the one hand, while simultaneously the insertion is facilitated.

A further embodiment is designed such that the spring housing has a slight oval shape before being inserted in the cup-shaped piston such that after having been pressed into the recess of the piston the spring housing and the piston form an integral part upon normal brake actuation, but the housing separates from the piston if an accidental actuation of the brake takes place during relining. Thus, the spring housing forms a firm component of the piston, on the one hand, but simultaneously serves as a safety feature against destruction in the mentioned accidental actuations.

According to another embodiment the spring housing has a bottom at which the adjusting nut expediently supports itself. Should a play arise between spring housing and piston according to the invention this is neutralized by a hand brake actuation.

According to a further embodiment a concentric aperture is provided in the bottom of the spring housing. It serves the purpose of providing a safe ventilation upon assembly. On the other hand according to another embodiment this aperture makes possible an extension of the adjusting spindle through the aperture into a recess in the piston bottom. Due to this design the structural length of the inventive adjusting device can be substantially reduced.

A further specially expedient embodiment is characterized in that the post extends from the spring housing towards the inside to the ramp. Here the post is advantageously bent out of the wall material of the spring housing.

The functions of the spring housing are furthermore supplemented by longitudinal slots cut out of the wall of the spring housing in the rear area, said longitudinal slots being distributed over the circumference, and being engaged by the one end of a leg spring returning the engaging element and/or by radial projections of a torsionally locked disc which is seated on the adjusting nut and is pressed against a step or shoulder on the outer surface of the adjusting nut by means of a helical spring supported by the housing. Thus, the spring housing also performs the duty of a support of the leg spring as well as that of a torsional locking of the disc which is pressed against the support by means of the spring. The other end of the spring presses against an abutment of the spring housing so that the piston is always brought with its bottom, or the bottom of the spring housing, respectively, in abutment with the front side of the adjusting nut.

According to another embodiment abutments for the spring are bent towards the inside at the ends of the webs of the spring housing remaining between the slots. In this embodiment the spring housing thus has a further duty.

A further embodiment provides that the longitudinal slots do not pass through to the rear end of the spring housing and that at the rear end a ring is inserted in an internal groove of the spring housing, said ring serving as counter-part or post for a frictional cone designed as the engaging element. In this embodiment the spring housing also serves as carrier for the above mentioned ring.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
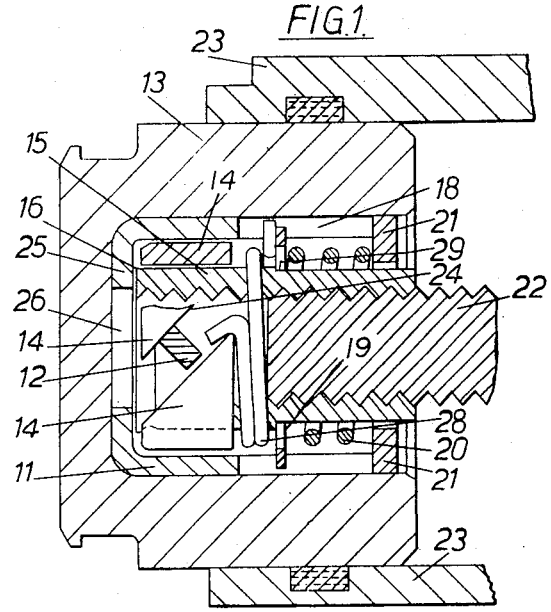
FIG. 1 is a cross-sectional view of a cup-shaped piston in a brake cylinder provided with an adjusting device in accordance with the principles of the present invention with engaging element 14 being illustrated partially in elevation.

According to FIG. 1 a cup-shaped piston with cylindrical cup-shaped recess is arranged displaceably in the usual manner in a brake cylinder 23. To simplify matters, brake linings and back plate are not represented. An adjusting nut 15 is threaded onto an adjusting spindle 22, represented only in part, which is fixed to cylinder 23, said adjusting nut 15 having an extending frictional cone 16 at its end adjacent the piston bottom, said frictional cone 16 cooperating with a corresponding frictional countersurface of an engaging element 14 arranged torsionally on nut 15. The engaging element 14 has a slanting slot the one edge of which forms a ramp 24 which is important for the adjustment.

According to this invention, leg spring 28 keeps engaging element 14 in abutment against a post 12, which extends towards the inside of spring housing 11 from the front inner surface of spring housing 11 as viewed in FIG. 1, provided spring 28 keeps engaging element 14 in abutment against a post 12, Spring housing 11 is impressed resiliently and in a locking manner in the cylindrical cup-shaped recess of the piston 13. It practically forms an integral part with the piston 13, but it separates without any parts being damaged, if the piston is moved too far to the left in FIG. 1 upon an accidental actuation of the brake such as during brake relining.

According to the invention spring housing 11 has a bottom 25, in the center of which there is an aperture 26. Bottom 25 extends far enough towards the inside, toward the longitudinal axis of housing 11, so that adjusting nut 15 can support itself on bottom 25.

The part of spring housing 11 adjacent the piston bottom has a cylindrical wall. Subsequently four longitudinal slots 18 are distributed over the circumference which serve as guiding elements for radial projections of a torsionally locked disc 19. Furthermore one end of leg spring 28 supports itself in these longitudinal slots. The disc 19 is pressed by a pressure spring 20 into abutment with a step 29 on the outer surface of adjusting nut 15. The other end of helical spring 20 supports itself on abutments 21 which are formed by bending the ends of the webs of spring housing 11 remaining between longitudinal slots 18.

Figure 2:
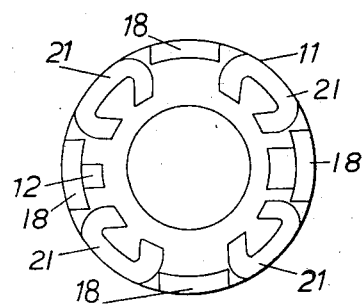
FIG. 2 is a back view of the spring housing of FIG. 1.

The operation of the adjusting device illustrated in FIG. 1 and 2 is as follows:

Upon normal brake actuation piston 13 as well as adjusting nut 15 and all other parts move towards the brake disc, (not shown) that is, towards the left in FIG. 1, and after removal of the hydraulic pressure it moves away from the brake disc. The necessary brake lining clearance is generally in the thread between adjusting spindle 22 and adjusting nut 25.

FIG. 1 shows the normal position of the adjusting device as long as the position of the actuating piston lies within the range of the brake clearance which, as mentioned above, is defined by the axial thread clearance between adjusting spindle 22 and adjusting nut 25. In this normal position element 14 is prestressed by the leg spring 28 in such a direction that ramp 24 of element 14 abuts post 12 of housing 11. Since housing 11 is fixed to actuating piston 13, post 12 can also be regarded as being directly connected to piston 13. Post 12 therefore performs the same axial movements as piston 13 and is protected against rotational movement around the axis of piston 13 due to piston 13 being torsionally locked in cylinder 23.

Owing to the stress of spring 28, ramp 24 tries to slide along post 12 towards the left lower corner of FIG. 1 so that element 14 is urged to the left, remaining in torsional locked abutment with the frictional surface of cone 16.

When piston 13 is moved to the left beyond the clearance of the thread due to slight brake lining wear, element 14 cannot follow the movement of piston 13 any more because it is held back by cone 16 of adjusting nut 15. Owing to the movement of piston 13, post 12 will urge ramp 24 to slide along post 12 towards the right upper corner of FIG. 1 thereby forcing element 14 to turn in a counter-clockwise direction when looking at the left side of FIG. 1. As the forward movement of post 12 during this part of the operation increases, the torsional locked abutment between the frictional surfaces of cone 16 and element 14 causes the above-mentioned counter-clockwise rotary movement of element 14 to be also transmitted to adjusting nut 15 so that nut 15 is turned on adjusting spindle 22 in a manner to move nut 15 toward bottom 25.

When the brake is released, piston 13 is moved to the right by helical spring 20 until bottom 25 of spring housing 11 comes into engagement with the adjacent end of adjusting nut 15. By the return movement of piston 13, post 12 also lifts off ramp 24 thus diminishing the frictional contact between cone 16 and the adjacent end of element 14. When the torsionally locked abutment between cone 16 and element 14 has become lower than the forces exerted on element 14 by spring 28, element 14 is twisted back into its initial position by turning in a clockwise direction when looking at the left side of FIG. 1.

Necessary brake clearance is obtained by return springs (not shown) acting on the brake shoes which push piston 13 to the right in FIG. 1 until the thread clearance is surpassed and piston 13 abuts against adjusting nut 15.

The task of helical pressure spring 20 is to always effect a certain pressure on adjusting nut 15 in order to avoid its undesired twisting, e.g. upon normal driving of the vehicle without braking.

The torsionally locked arrangement of disc 19 is provided according to the invention in order to safely eliminate the transmitting of possible torques by the pressure spring 20.

The assembly of the inventive adjusting device is extremely simple. After all parts of the adjusting device including the spring housing 11 have been assembled only the piston 13 has to be slipped on under resilient compressing of the spring housing. The assembly can be effected in the same manner should the piston be separated from the spring housing 11 upon an accidental or faulty actuation.

Figure 3:
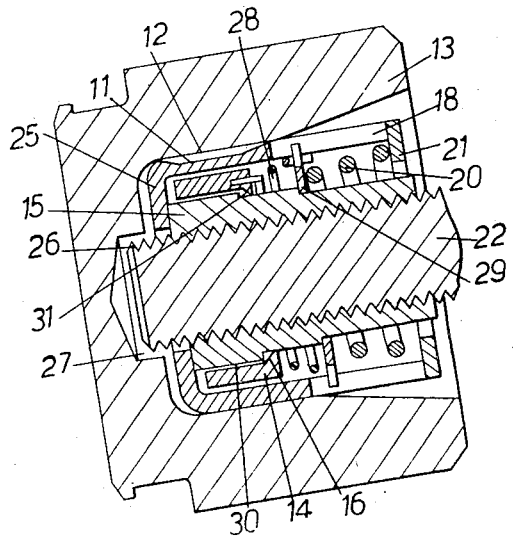
FIG. 3 is a cross-sectional view of a further embodiment of the adjusting device in accordance with the principles of the present invention.

In the embodiment of FIG. 3, the operation of which is substantially the same as that of the embodiment of FIG. 1, adjusting spindle 22 extends through aperture 26 in the bottom of spring housing 11 into a recess 27 of the piston bottom. Thus, the axial structural length of the adjusting device is substantially reduced.

Engaging element 14 is seated via a cylindrical sliding guidance 30 on adjusting nut 15, the frictional cone being provided at the right end of the engaging element 14 extending towards the inside. It cooperates with a stepwise expanding edge 31 of adjusting nut 15. The arrangement of ramp 24 and post 12 is analogous to the embodiment of FIG. 1. The other parts of the arrangement provided with the same reference numerals are designed in the same manner as the parts of the embodiment of FIG. 1 provided with the same reference numerals. The operation, too, is completely analogous.

Figure 4:
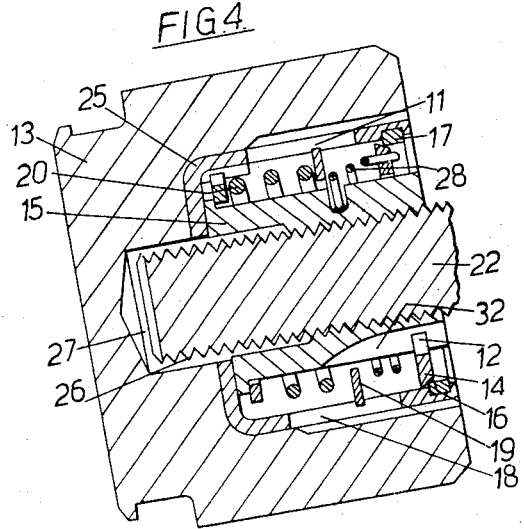
FIG. 4 is a cross-sectional view of still a further embodiment of the adjusting device in accordance with the principles of the present invention.

In the embodiment of FIG. 4, too, adjusting spindle 22 extends through bottom 25 of spring housing 11 into recess 27 in the piston bottom.

In this embodiment, however, the springs 20 and 28 are exchanged in their sequence without their task being different from that of the embodiments mentioned up to now. According to the embodiment of FIG. 4 the frictional cone 16 cooperates with the edge of a ring 17 inserted in an internal groove of spring housing 11.

In this embodiment post 12 according to the invention extends towards the inside into a slanting groove 32 at which the ramp is designed which is important for the engaging action.

As regards its operation the embodiment of FIG. 4 corresponds to the operation of the two other embodiments.

In connection with the engaging elements guided exactly on the threaded sleeves, action and reaction forces advantageously engage with nearly the same lever arms. Thus, in connection with the oscillating adjusting movement the result is a high safety with regards to its operation.

Due to the inventive arrangement eccentricities of the drive spindle, the adjusting nut, the engaging element etc. are of no disadvantage in respect to the operation. The production can be effected with small requirements with respect to the accuracy thereof and, thus, will be cheaper.

Due to the multiple use of the parts the design is simpler and the number of parts is smaller. Thus, the bleeding slots, the ring, the abutments etc. can be manufactured in one single operation. Due to the arrangement of the parts in the cup-shaped spring housing, the assembly is easy and the bleeding is good.

Furthermore, it is advantageous that, instead of the axial component of the operating coupling force, the hand actuating force acting on the bottom of the spring housing is used for the compensation of the clearance. Another improvement is the better bleeding as the device works according to the displacement principle through the aperture in the bottom, and the open manner of the design safeguards a free venting of the air.

The manufacture of the spring housing is simple. The bleeding slots and the guide ring as well as the abutments can be manufactured in one single operation.

In spite of the small space demand, according to the invention, all parts are rated strong enough so that they can be used simultaneously for pistons with different diameters, e.g. from 33 to 48 mm.

According to the invention the tight fit between spring housing 11 and piston 13 can be further improved by notches, should this be necessary.

While we have described above the principles of our invention in connection with specific apparatus it is to be clearly understood that this description is made only by way of example and not as a limitation to the scope of our invention as set forth in the objects thereof and in the accompanying claims.

We claim:

1. A self-adjusting device for brake lining clearance of disc brakes comprising:
   a cup-shaped piston contained in a hydraulically actuated brake cylinder;
   a spring housing having a longitudinal axis;
   a threaded adjusting spindle disposed coaxially within said housing;
   an adjusting nut disposed within said housing and threaded onto said spindle in a self-locking manner;
   an engaging element having an inclined ramp which, upon adjustment only, is in a torsionally locked connection with said nut;
   a spring disposed within said housing, coaxial with the exterior surface of said nut and in cooperative relation to said engaging element; and
   a post fixed to said housing to cooperate with said ramp to enable the desired adjustment;
   said clearance being provided by the cooperating threads of said spindle and said nut; and
   said housing is inserted into said piston and is resiliently clamped in position therein by the interior surface of said piston.

2. A device according to claim 1, wherein
said interior surface of said piston is cylindrical throughout its entire length.

3. A device according to claim 1, wherein
said interior surface of said piston is cylindrical adjacent the bottom thereof for resilient clamping of said housing and is tapered outwardly over the remainder of its length.

4. A device according to claim 1, wherein
said interior surface of said piston is cylindrical and has a given diameter adjacent the bottom thereof for resilient clamping of said housing and is stepped outwardly so that the remainder of its length has a diameter greater than said given diameter.

5. A device according to claim 1, wherein
said housing has a slightly oval form prior to being inserted into said piston so that said piston and said housing form an integral part during normal brake actuation, but enables said housing to separate from said piston if there is an accidental brake actuation during brake relining.

6. A device according to claim 1, wherein
said housing has a bottom wall transverse of said longitudinal axis.

7. A device according to claim 6, wherein
said nut supports itself on said bottom wall.

8. A device according to claim 7, wherein
said bottom wall has an aperture therethrough concentric with said longitudinal axis.

9. A device according to claim 8, wherein
said spindle extends through said aperture into a recess formed in the bottom of said piston.

10. A device according to claim 1, wherein said post extends from said housing towards the inside thereof in a cooperative relationship with said ramp.

11. A device according to claim 10, wherein said post is formed from the material of said housing.

12. A device according to claim 1, wherein
said housing includes longitudinal slots in the wall thereof spaced from the outer end of said housing, said slots being distributed about the circumference of said housing, and
one end of said spring engages at least one of said slots.

13. A device according to claim 12, further including a torsionally locked disc having projections thereon engaging certain ones of said slots, and
an additional spring pressing said disc against a shoulder formed on the outer surface of said nut.

14. A device according to claim 13, wherein
at least certain of the material of said housing adjacent said outer end thereof between said slots are bent inwardly to form an abutment for said additional spring.

15. A device according to claim 12, further including a first ring inserted in a groove formed in the inner surface of said housing between the end of said slots and said outer end of said housing, and
a second ring secured to the outer surface of said nut, the outer surface of said second ring having a conical surface associated with an edge of said first ring.

* * * * *